(12) United States Patent
Aitken et al.

(10) Patent No.: US 8,541,324 B2
(45) Date of Patent: Sep. 24, 2013

(54) PERGALLOUS ALKALINE EARTH SELENOGERMANATE GLASSES

(75) Inventors: Bruce Gardiner Aitken, Corning, NY (US); Stephen Charles Currie, Corning, NY (US)

(73) Assignee: Corning Incorporated, Corning, NY (US)

( * ) Notice: Subject to any disclaimer, the term of this patent is extended or adjusted under 35 U.S.C. 154(b) by 55 days.

(21) Appl. No.: 13/306,386

(22) Filed: Nov. 29, 2011

(65) Prior Publication Data

US 2012/0135850 A1 May 31, 2012

Related U.S. Application Data

(60) Provisional application No. 61/418,150, filed on Nov. 30, 2010.

(51) Int. Cl.
*C03C 3/32* (2006.01)
*C03C 13/04* (2006.01)

(52) U.S. Cl.
USPC .............................................. 501/40; 501/37

(58) Field of Classification Search
USPC ...................................................... 501/40, 37
See application file for complete search history.

(56) References Cited

U.S. PATENT DOCUMENTS

| | | | |
|---|---|---|---|
| 5,389,584 A | 2/1995 | Aitken et al. | 501/40 |
| 5,392,376 A | 2/1995 | Aitken et al. | 385/144 |
| 5,846,889 A | 12/1998 | Harbison et al. | 501/40 |
| RE36,513 E | 1/2000 | Aitken et al. | 385/144 |

FOREIGN PATENT DOCUMENTS

FR      7311005      10/1974

OTHER PUBLICATIONS

Mei, Qiang, et al., Preparation and characterization of glasses in the $Ag_2S + B_2S_3 + GeS_2$ system, *Journal of Non-Crystalline Solids*, 324 (2003), pp. 264-276.

*Primary Examiner* — Karl Group
(74) *Attorney, Agent, or Firm* — Michael W. Russell

(57) ABSTRACT

IR-transmitting alkaline earth selenogallo- and/or selenoindo-germanate glasses that are capable of hosting luminescent rare earth dopants. The relatively high Ga and/or In content of most compositions serves to eliminate the typical clustering tendency of rare earth dopants in chalcogenide glasses, resulting in improved luminescence.

19 Claims, No Drawings

PERGALLOUS ALKALINE EARTH SELENOGERMANATE GLASSES

This application claims the benefit of priority under 35 U.S.C. §119 of U.S. Provisional Application Ser. No. 61/418,150 filed on Nov. 30, 2010 the content of which is relied upon and incorporated herein by reference in its entirety.

BACKGROUND

1. Field

Embodiments relate generally to glass compositions and more particularly to infrared (IR) transmitting glasses useful for, for example, windows, waveguiding fibers, and/or host glasses for luminescent dopants.

2. Technical Background

U.S. Pat. No. 5,846,889 "Infrared Transparent Selenide Glasses" discloses alkaline earth Ga and/or In-containing selenogermanate glasses comprising at least 5% RSe (where R=alkaline earth), 0.5-25% $Ga_2Se_3$ and/or $In_2Se_3$, 20-70% $GeSe_2$ with the provision for rare earth dopants. However, due to the relatively Ga- and/or In-poor nature of the compositions, it is likely that rare-earth dopants in such glasses are clustered and, therefore, characterized by reduced luminescent efficiency.

It would be advantageous to expand the range of BaGaGe selenide glasses that can be synthesized. Moreover, it would be advantageous to have "pergallous" glasses that may provide for a greater intensity/efficiency of rare earth luminescence.

SUMMARY

Embodiments of glass compositions have a Ga/Ba ratio greater than unity and such "pergallous" glasses are expected to provide for greater intensity/efficiency of rare earth luminescence.

Embodiments relate to infrared (IR) transmitting glasses that have potential application as IR windows, waveguiding fibers, or as host glasses for luminescent dopants, particularly rare earths, with emissions that are compromised by multiphonon decay in conventional oxide materials. Specifically, it relates to Ga- and/or In-containing chalcogenide glasses based on $GeSe_2$ that are modified by the presence of one or more alkaline earths, particularly Ba.

One embodiment is a glass composition comprising in mole percent:
50 to 95 percent $GeSe_2$;
0.5 to 50 percent $Ga_2Se_3$, $In_2Se_3$, or a combination thereof; and
0.5 to 50 percent RSe, wherein R is an alkaline earth metal.

Additional features and advantages of the invention will be set forth in the detailed description which follows, and in part will be readily apparent to those skilled in the art from the description or recognized by practicing the invention as described in the written description and claims hereof.

It is to be understood that both the foregoing general description and the following detailed description are merely exemplary of the invention, and are intended to provide an overview or framework for understanding the nature and character of the invention as it is claimed.

DETAILED DESCRIPTION

Reference will now be made in detail to various embodiments of the invention.

One embodiment is a glass composition comprising in mole percent:
50 to 95 percent $GeSe_2$;
0.5 to 50 percent $Ga_2Se_3$, $In_2Se_3$, or a combination thereof; and
0.5 to 50 percent RSe, wherein R is an alkaline earth metal.

In one embodiment, the (Ga and/or In)/R ratio is greater than 1.

The glass composition according to some embodiments, comprises greater than 50 percent $GeSe_2$, for example, greater than 55 percent $GeSe_2$, for example, greater than 60 percent $GeSe_2$, for example, greater than 65 percent $GeSe_2$, for example, greater than 70 percent $GeSe_2$, for example, greater than 71 percent $GeSe_2$, for example, greater than 72 percent $GeSe_2$, for example, greater than 73 percent $GeSe_2$, for example, greater than 74 percent $GeSe_2$, for example, greater than 75 percent $GeSe_2$, for example, greater than 76 percent $GeSe_2$. The amount of $GeSe_2$ can be any numerical value in the range of from 50 to 95 mole percent.

In one embodiment, the glass composition comprises more than one alkaline earth metal. In some embodiments, the alkaline earth metal is Ba, Sr, Ca, or combinations thereof.

In some embodiments, the glass composition comprises $Ga_2Se_3$ and BaSe. The Ga/Ba ratio can be greater than 1.

The glass composition can comprise greater than 15 percent $Ga_2Se_3$, $In_2Se_3$, or a combination thereof, for example, greater than 16 percent, for example, greater than 17 percent, for example, greater than 18 percent, for example, greater than 19 percent, for example, greater than 20 percent, for example, greater than 21, for example, greater than 22 percent, for example, greater than 23 percent, for example, greater than 24 percent, for example, greater than 25 percent, for example, greater than 26 percent, for example, greater than 27 percent, for example, greater than 28 percent, for example, greater than 29 percent, for example, greater than 30 percent. The amount of $Ga_2Se_3$, $In_2Se_3$, or a combination thereof can be any numerical value in the range of from 0.5 to 50 mole percent. The glass in one embodiment comprises $Ga_2Se_3$ and not $In_2Se_3$. The glass in one embodiment comprises $In_2Se_3$ and not $Ga_2Se_3$.

The glass composition can further comprise one or more rare earth dopants, for example, 0 to 10 mole percent of the rare earth dopants, for example, greater than 0 to 10 mole percent of the rare earth dopants, for example, 0.5 to 10 mole percent of the rare earth dopants. The amount of rare earth dopants can be any numerical value in the range of from 0 to 10 mole percent.

The glass composition according to one embodiment comprises less than 37.5 percent RSe, for example, less than 35 percent, for example, less than 34 percent, for example, less than 33 percent, for example, less than 32.5 percent, for example, less than 30 percent, for example, less than 29 percent, for example, less than 28 percent, for example, less than 27 percent, for example, less than 26 percent, for example, less than 25 percent, for example, less than 24 percent, for example, less than 23 percent, for example, less than 22 percent, for example, less than 21 percent, for example, less than 20 percent, for example, less than 19 percent, for example, less than 18 percent, for example, less than 17 percent, for example, less than 16 percent, for example, less than 15 percent, for example, less than 14 percent, for example, less than 13 percent, for example, less than 12 percent, for example, less than 11 percent, for example, less than 10 percent, for example, less than 9 percent, for example, less than 8 percent, for example, less than 7 percent, for example, less than 6 percent, for example, less than 5 percent, for example, less than 4 percent, for example, less than 3 percent, for example, less than 2 percent. The amount of RSe can be any numerical value in the range of from 0.5 to 50 mole percent. In one embodiment, R is Ba.

The glass, in some embodiments, is transparent in the infra red spectrum.

The glass composition, according to some embodiments comprises:
  greater than 70 percent $GeSe_2$;
  greater than 25 percent $Ga_2Se_3$, $In_2Se_3$, or a combination thereof; and
  less than 29 percent RSe, wherein R is an alkaline earth metal.

The glass composition, according to some embodiments, comprises:
  greater than 70 percent $GeSe_2$;
  greater than 25 percent $Ga_2Se_3$; and
  less than 29 percent BaSe.

The glass composition, according to some embodiments, comprises:
  greater than 65 percent $GeSe_2$;
  greater than 15 percent $Ga_2Se_3$, $In_2Se_3$, or a combination thereof; and
  less than 32.5 percent RSe, wherein R is an alkaline earth metal.

The glass composition, according to some embodiments, comprises:
  greater than 65 percent $GeSe_2$;
  greater than 15 percent $Ga_2Se_3$; and
  less than 32.5 percent BaSe.

Significant expansion of the glassforming region of alkaline earth selenogermanate glasses allows for greater flexibility in tailoring glass properties such as characteristic temperatures (e.g. $T_g$), thermal expansion coefficient, refractive index, etc. that may be important for specific applications. Moreover, as noted above, the fact that the Ga and/or In to alkaline earth ratio is typically greater than one results in the efficient dispersal of rare earth dopants and, hence, improved luminescence. In addition, such "pergallous" and/or "perindous" glasses are expected to have superior chemical durability when compared to similar glasses with (Ga,In)/R<1. Finally, as alkaline earth metals have a strong tendency to react with silica—the typical crucible material used for the preparation of chalcogenide glasses—"pergallous" and/or "perindous" melts have a reduced reaction tendency and, hence, the resultant glasses are expected to show no or insignificant oxide contamination which could limit their IR transparency.

The exemplary glasses were all prepared using typical chalcogenide glass melting/forming procedures. 10 g batches of elements (Ba, Ga, Ge, Se) were loaded into fused silica ampoules in a $N_2$-filled glovebox. The ampoules were evacuated to $\sim 10^{-5}$ Torr, flame sealed and then heated to $\sim 950°$ C. in a rocking furnace. After melting, the ampoules were quenched in room temperature water to convert the selenide melts to glass. Exemplary glass compositions are tabulated below, with the first rows expressing the composition in terms of the molar percentages of the various selenide components and with the second rows expressing the composition in terms of atomic percent. Although the alkaline earth in all cited examples is Ba, analogous glasses are to be expected when Ba is replaced by Sr and/or Ca. The glass transition temperature ($T_g$) and the onset of crystallization ($T_x$) were measured by differential scanning calorimetry (DSC).

Exemplary glass compositions are shown in Table 1, Table 2, Table 3, and Table 4.

TABLE 1

| Example | 1 | 2 | 3 | 4 | 5 | 6 | 7 | 8 |
|---|---|---|---|---|---|---|---|---|
| mol % | | | | | | | | |
| BaSe | 5 | 7.5 | 10 | 12.5 | 15 | 17.5 | 12.5 | 15 |
| $Ga_2Se_3$ | 20 | 17.5 | 15 | 12.5 | 10 | 7.5 | 27.5 | 25 |
| $GeSe_2$ | 75 | 75 | 75 | 75 | 75 | 75 | 60 | 60 |
| atomic % | | | | | | | | |
| Ba | 1.49 | 2.29 | 3.13 | 4 | 4.92 | 5.88 | 3.65 | 4.48 |
| Ga | 11.94 | 10.69 | 9.38 | 8 | 6.56 | 5.04 | 16.06 | 14.93 |
| Ge | 22.39 | 22.9 | 23.44 | 24 | 24.59 | 25.21 | 17.52 | 17.91 |
| Se | 64.18 | 64.12 | 64.06 | 64 | 63.93 | 63.87 | 62.77 | 62.69 |
| $T_g$ | 376 | 382 | 389 | 396 | 398 | 395 | 391 | 391 |
| $T_x$ | 437 | 443 | 452 | 466 | 487 | 484 | 437 | 443 |

TABLE 2

| Example | 9 | 10 | 11 | 12 | 13 | 14 | 15 | 16 |
|---|---|---|---|---|---|---|---|---|
| mol % | | | | | | | | |
| BaSe | 22.5 | 25 | 27.5 | 30 | 32.5 | 10 | 7.5 | 20 |
| $Ga_2Se_3$ | 17.5 | 15 | 12.5 | 10 | 7.5 | 30 | 32.5 | 5 |
| $GeSe_2$ | 60 | 60 | 60 | 60 | 60 | 60 | 60 | 75 |
| atomic % | | | | | | | | |
| Ba | 7.2 | 8.2 | 9.24 | 10.34 | 11.5 | 2.86 | 2.1 | 6.9 |
| Ga | 11.2 | 9.84 | 8.4 | 6.9 | 5.31 | 17.14 | 18.18 | 3.45 |
| Ge | 19.2 | 19.67 | 20.17 | 20.69 | 21.24 | 17.14 | 16.78 | 25.86 |
| Se | 62.4 | 62.3 | 62.18 | 62.07 | 61.95 | 62.86 | 62.94 | 63.79 |
| $T_g$ | 397 | 400 | 399 | 397 | 394 | 378 | 372 | 395 |
| $T_x$ | 474 | 480 | 503 | 500 | 491 | 427 | 422 | 481 |

TABLE 3

| Example | 17 | 18 | 19 | 20 | 21 | 22 | 23 |
|---|---|---|---|---|---|---|---|
| mol % | | | | | | | |
| BaSe | 15 | 17.5 | 5 | 7.5 | 5 | 10 | 15 |
| $Ga_2Se_3$ | 35 | 27.5 | 30 | 27.5 | 24 | 19 | 14 |
| $GeSe_2$ | 55 | 55 | 65 | 65 | 71 | 71 | 71 |
| atomic % | | | | | | | |
| Ba | 4.35 | 5.19 | 1.41 | 2.16 | 1.46 | 3.05 | 4.79 |
| Ga | 17.39 | 16.3 | 16.9 | 15.83 | 13.99 | 11.59 | 8.95 |
| Ge | 15.94 | 16.3 | 18.31 | 18.71 | 20.7 | 21.65 | 22.68 |
| Se | 62.32 | 62.22 | 63.38 | 63.31 | 63.85 | 63.72 | 63.58 |
| $T_g$ | | | | | 381 | | 396 |
| $T_x$ | | | | | 440 | | 467 |

TABLE 4

| Example | 24 | 25 | 26 | 27 | 28 | 29 |
|---|---|---|---|---|---|---|
| mol % | | | | | | |
| BaSe | 20 | 25 | 4.99 | 4.99 | 17.49 | 17.49 |
| $Ga_2Se_3$ | 9 | 4 | 20 | 20 | 7.5 | 7.5 |
| $GeSe_2$ | 71 | 71 | 74.97 | 74.97 | 74.97 | 74.97 |
| $Pr_2Se_3$ | | | 0.05 | | 0.04 | |
| $Dy_2Se_3$ | | | | 0.04 | | 0.04 |
| atomic % | | | | | | |
| Ba | 6.71 | 8.83 | 1.49 | 1.49 | 5.88 | 5.88 |
| Ga | 6.04 | 2.83 | 11.94 | 11.94 | 5.04 | 5.04 |
| Ge | 23.83 | 25.09 | 22.38 | 22.38 | 25.2 | 25.2 |
| Se | 63.42 | 63.25 | 64.17 | 64.17 | 63.85 | 63.85 |
| Pr | | | 0.027 | | 0.029 | |
| Dy | | | | 0.024 | | 0.025 |
| $T_g$ | | 377 | 376 | 396 | 394 | |
| $T_x$ | | 437 | 438 | 484 | | |

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A glass composition comprising in mole percent:
   50 to 95 percent $GeSe_2$;
   greater than 25 to less than 49.5 percent $Ga_2Se_3$, $In_2Se_3$, or a combination thereof; and
   0.5 to less than 25 percent RSe, wherein R is an alkaline earth metal.

2. The glass composition according to claim 1, wherein (Ga and/or In)/R is greater than 1.

3. The glass composition according to claim 1, comprising greater than 50 percent $GeSe_2$.

4. The glass composition according to claim 1, comprising greater than 55 percent $GeSe_2$.

5. The glass composition according to claim 1, comprising greater than 60 percent $GeSe_2$.

6. The glass composition according to claim 1, comprising greater than 65 percent $GeSe_2$.

7. The glass composition according to claim 1, comprising greater than 70 percent $GeSe_2$.

8. The glass composition according to claim 1, comprising more than one alkaline earth metal.

9. The glass composition according to claim 1, wherein the alkaline earth metal is Ba, Sr, Ca, or combinations thereof.

10. The glass composition according to claim 1, wherein the glass comprises $Ga_2Se_3$ and BaSe.

11. The glass composition according to claim 10, wherein the Ga/Ba ratio is greater than 1.

12. The glass composition according to claim 1, further comprising one or more rare earth dopants.

13. The glass composition according to claim 12, comprising 0 to 10 mole percent of the rare earth dopants.

14. The glass composition according to claim 1, wherein R is Ba.

15. The glass according to claim 1, wherein the glass is transparent in the infra red spectrum.

16. The glass composition according to claim 1, comprising
    greater than 70 percent $GeSe_2$;
    greater than 25 percent $Ga_2Se_3$, $In_2Se_3$, or a combination thereof; and
    less than 5 percent RSe, wherein R is an alkaline earth metal.

17. The glass composition according to claim 1, comprising
    greater than 70 percent $GeSe_2$;
    greater than 25 percent $Ga_2Se_3$; and
    less than 5 percent BaSe.

18. The glass composition according to claim 1, comprising
    greater than 65 percent $GeSe_2$;
    greater than 25 percent $Ga_2Se_3$, $In_2Se_3$, or a combination thereof; and
    less than 10 percent RSe, wherein R is an alkaline earth metal.

19. The glass composition according to claim 1, comprising
    greater than 65 percent $GeSe_2$;
    greater than 25 percent $Ga_2Se_3$; and
    less than 10 percent BaSe.

* * * * *